UNITED STATES PATENT OFFICE.

MAX MAYER, OF TEMPELHOF, AND BELA HAVAS, OF SCHÖNEBERG, NEAR BERLIN, GERMANY, ASSIGNORS TO CHEMISCH-METALLURGISCHE INDUSTRIE GESELLSCHAFT MIT BESCHRÄNKTER HAFTUNG, OF BERLIN, GERMANY, A CORPORATION OF GERMANY.

ENAMELS AND PROCESS OF MAKING THEM.

1,104,266. Specification of Letters Patent. Patented July 21, 1914.

No Drawing. Application filed November 19, 1912. Serial No. 732,216.

*To all whom it may concern:*

Be it known that we, MAX MAYER, a citizen of the German Empire, and resident of Tempelhof, near Berlin, Germany, and BELA HAVAS, a citizen of the Kingdom of Hungary, and resident of Schöneberg, near Berlin, Germany, have jointly invented certain new and useful Improvements in Enamels and Processes of Making Them.

Stannic oxid, added to the enamel before or during the grinding operation, has been used hitherto exclusively for the purpose of giving enamel an opaque white color. Attempts made so far to find substitutes for stannic oxid which would be cheaper yet just as efficient, have generally failed to yield commercially available results.

In Tscheuschner's "*Glas - Fabrikation*" 5th edition 1885, page 552, and in Wilkens-Schumacher's "*Die Keramischen Tonfabrikate*" 5th edition, 1884, page 189, we find statements to the effect that opaquing properties have been ascribed to sodium aluminate and to alumina. It should be borne in mind, however, that a substance having the property of giving a white color, to a glass melt, will by no means in every case be suitable for giving an opaque white color to enamel. For the latter purpose the substance must not only have the requisite opaquing property, but it must also to a certain degree, enter into reaction with the so-called covering enamel and yield a smooth surface.

Our experiments have shown that the addition of sodium aluminate to enamels does not give them any opaque tint worth mentioning, whether the aluminate be used in the crude state or after preliminary heating. In either case, an almost transparent molten mass is obtained. Pure aluminum oxid yields about the same result if used without heating (calcining). With pure aluminum oxid subjected to a preliminary heating it is indeed possible to obtain opaque tinted or white enamel, but only by using the oxid in so large quantities that the surface becomes rough and thus utterly unsuitable for enamel work. The reason for this failure is that calcined aluminum oxid also fails to dissolve in the glass melt to the degree required for the production of a thoroughly opaque enamel having a smooth surface.

Magnesium oxid, which also is of a pure white color has not been proposed hitherto as an "opaquing" agent for enamel, and experiments made by us showed that it is unsuitable for this purpose.

We have made the surprising discovery that good opaquing effects may be obtained by using calcined mixtures of magnesium oxid and of aluminum oxid or zinc oxid and aluminum oxid, that is to say, mixtures of substances which used alone or singly cannot be employed as opaquing agents for enamels. One of the mixtures yields a compound of the formula $MgOAl_2O_3$ (magnesium spinel) resp. $ZnOAl_2O_3$ (zinc spinel), which will produce just as good results and which will be probably to a certain degree contained in all the calcined mixtures.

The opaquing effect produced on enamels is increased by using calcined mixtures of aluminum oxid and magnesium oxid or aluminum oxid and zinc oxid to which has been added before calcining stannic oxid, zirconium oxid, titanic oxid, silicic oxid or other white refractory materials or mixtures of such substances. Opaquing effects materially stronger than those obtained with the pure mixtures alone are obtained even with additions of only 10% of the amount of the mixture of aluminum oxid and magnesium oxid. The effect observed is such that it cannot be considered a mere sum of the individual effects. It is not clear whether these additions simply increase the opaquing effect or whether they also improve the capacity of the opaquing agent for distributing itself in the channel.

Not only calcined mixtures of aluminum oxid and magnesium oxid but as already mentioned calcined mixtures of zinc oxid and aluminum oxid likewise are suitable for use as an opaquing agent according to our invention. The poisonous nature of these mixtures, however, prohibits their use in some cases, and we intend to use them chiefly for so-called cosmetic (decorative) enamels.

Our invention is of great commercial value, as will be obvious upon considering that the calcined mixtures can be produced much more cheaply than stannic oxid, which is the only agent used hitherto on a large scale for hygienic enamels. Even when the additions named above are used to increase the opaquing effect, the saving is quite considerable as compared with the employment of stannic oxid.

When in the claims, we use the word "spinel" we wish it to be understood that we desire thus to specify either a mixture of magnesium oxid and aluminum oxid said mixture having been previously calcined at such high temperatures as to form magnesium spinel, or a mixture of zinc oxid and aluminum oxid said mixture having been previously calcined at such high temperatures as to form zinc spinel.

We claim as our invention:

1. The process of producing white opaque enamels, which consists in adding to the enamel proper a white opaquing agent containing spinel.

2. The process of producing white opaque enamels, which consists in adding to the enamel proper a white opaquing agent containing spinel and a suitable white refractory material.

3. A white opaque enamel comprising a body of enamel proper containing spinel as the whitely opaquing medium.

4. A white opaque enamel comprising in addition to the enamel proper, a suitable white refractory material and spinel as the whitely opaquing medium.

In witness whereof we have hereunto set our hands in the presence of two subscribing witnesses.

MAX MAYER.
BELA HAVAS.

Witnesses:
HENRY HASPER,
WOLDEMAR HAUPT.